US011230794B2

(12) United States Patent
Hemphill et al.

(10) Patent No.: US 11,230,794 B2
(45) Date of Patent: *Jan. 25, 2022

(54) USE OF NONAFLUOROBUTANESULFONIC ACID IN A LOW PH ETCH SOLUTION TO INCREASE ALUMINUM FOIL CAPACITANCE

(71) Applicant: Pacesetter, Inc., Sylmar, CA (US)

(72) Inventors: Ralph Jason Hemphill, Sunset, SC (US); Timothy R. Marshall, Pickens, SC (US)

(73) Assignee: Pacesetter, Inc., Sylmar, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/276,319

(22) Filed: Feb. 14, 2019

(65) Prior Publication Data
US 2019/0177871 A1 Jun. 13, 2019

Related U.S. Application Data

(63) Continuation of application No. 15/459,750, filed on Mar. 15, 2017, now Pat. No. 10,240,249.

(60) Provisional application No. 62/429,444, filed on Dec. 2, 2016.

(51) Int. Cl.
C25F 3/04 (2006.01)
C25F 3/02 (2006.01)
C25F 3/20 (2006.01)
H01G 9/055 (2006.01)
H01G 9/00 (2006.01)

(52) U.S. Cl.
CPC ............... C25F 3/04 (2013.01); C25F 3/02 (2013.01); C25F 3/20 (2013.01); H01G 9/0029 (2013.01); H01G 9/0032 (2013.01); H01G 9/055 (2013.01)

(58) Field of Classification Search
None
See application file for complete search history.

(56) References Cited

U.S. PATENT DOCUMENTS

| 3,622,843 A | 11/1971 | Vermilyea et al. |
| 3,662,843 A | 5/1972 | Wise |
| 3,755,116 A | 8/1973 | Terai et al. |
| 3,872,579 A | 3/1975 | Papadopoulos et al. |
| 3,899,400 A * | 8/1975 | Patrie .................. C25F 3/04 205/50 |

(Continued)

FOREIGN PATENT DOCUMENTS

| JP | 54125599 A * | 9/1979 | ............... B23H 3/08 |
| JP | 59118900 A | 7/1984 | |

(Continued)

OTHER PUBLICATIONS

Machine translation of JP 54-125599 of Inoue. (Year: 1979).*

(Continued)

Primary Examiner — Brian W Cohen

(57) ABSTRACT

Anode foil, preferably aluminum anode foil, is etched using a process of treating the foil in an electrolyte bath composition comprising a perfluoroalkylsulfonate, a sulfate, a halide, and an oxidizing agent. The anode foil is etched in the electrolyte bath composition by passing a direct current charge through the bath. The etched anode foil is suitable for use in an electrolytic capacitor.

20 Claims, 3 Drawing Sheets

(56) References Cited

U.S. PATENT DOCUMENTS

| | | | |
|---|---|---|---|
| 3,957,669 A * | 5/1976 | Tulsi | C23D 3/00 252/79.4 |
| 4,213,835 A | 7/1980 | Fickelscher et al. | |
| 4,266,332 A | 5/1981 | Markarian et al. | |
| 4,294,672 A * | 10/1981 | Ohba | B41N 3/034 205/646 |
| 4,381,231 A | 4/1983 | Arora | |
| 4,420,367 A | 12/1983 | Locher et al. | |
| 4,427,506 A | 1/1984 | Nguyen et al. | |
| 4,474,657 A | 10/1984 | Arora et al. | |
| 4,518,471 A | 5/1985 | Arora et al. | |
| 4,525,249 A | 6/1985 | Arora et al. | |
| 4,541,037 A | 9/1985 | Ross et al. | |
| 4,582,574 A | 4/1986 | Nguyen et al. | |
| 4,588,486 A | 5/1986 | Nguyen et al. | |
| 4,593,343 A | 6/1986 | Ross et al. | |
| 4,663,824 A | 5/1987 | Kenmochi et al. | |
| 4,696,082 A | 9/1987 | Fonfria et al. | |
| 4,997,534 A | 3/1991 | Thornton | |
| 5,131,388 A | 7/1992 | Pless et al. | |
| 5,405,493 A | 4/1995 | Goad | |
| 5,522,851 A | 6/1996 | Fayram et al. | |
| 5,715,133 A | 2/1998 | Harrington et al. | |
| 5,901,032 A | 5/1999 | Harrington et al. | |
| 6,168,706 B1 | 1/2001 | Hemphill et al. | |
| 6,224,738 B1 | 5/2001 | Sudduth et al. | |
| 6,238,810 B1 | 5/2001 | Strange et al. | |
| 6,555,510 B2 * | 4/2003 | Lamanna | B01F 17/0057 510/175 |
| 6,736,956 B1 | 5/2004 | Hemphill et al. | |
| 6,858,126 B1 | 2/2005 | Hemphill et al. | |
| 6,955,991 B2 | 10/2005 | Bollinger et al. | |
| 7,578,924 B1 * | 8/2009 | Jiang | C25F 3/04 205/640 |
| 7,846,217 B2 | 12/2010 | Poplett et al. | |
| 8,025,829 B2 | 9/2011 | Zhang et al. | |
| 8,038,866 B2 | 10/2011 | Hemphill et al. | |
| 8,871,358 B2 | 10/2014 | Hemphill et al. | |
| 8,992,787 B2 | 3/2015 | Jiang et al. | |
| 9,412,525 B2 | 8/2016 | Bowen et al. | |
| 10,072,349 B2 | 9/2018 | Jiang et al. | |
| 2001/0007306 A1 | 7/2001 | Ichinose et al. | |
| 2002/0092777 A1 | 7/2002 | Yoshimura et al. | |
| 2002/0108861 A1 | 8/2002 | Emesh et al. | |
| 2003/0178320 A1 | 9/2003 | Liu et al. | |
| 2004/0266650 A1 | 12/2004 | Lambotte et al. | |
| 2008/0216890 A1 | 9/2008 | Lim et al. | |
| 2008/0233307 A1 | 9/2008 | Satou et al. | |
| 2008/0253085 A1 | 10/2008 | Soffer et al. | |

FOREIGN PATENT DOCUMENTS

| | | |
|---|---|---|
| JP | 06077094 | 10/1994 |
| JP | 2001314712 | 11/2001 |
| WO | 02/092211 | 11/2002 |

OTHER PUBLICATIONS

Restriction Requirement dated Sep. 18, 2018—parent U.S. Appl. No. 15/459,750.
Notice of Allowance dated Nov. 13, 2018—parent U.S. Appl. No. 15/459,750.
Non-Final Office Action dated May 31, 2012—Related U.S. Appl. No. 13/028,121.
Amendment filed Oct. 1, 2012—Related U.S. Appl. No. 13/028,121.
Final Office Action dated Dec. 10, 2012—Related U.S. Appl. No. 13/028,121.
Dukhin et al., "Acoustic and Electroacoustic Spectroscopy for Characterizing Concentrated Dispersions and Emulsions," Advances in Colloid and Interface Science 92 (2001) 73-132.
Dunkhin et al., "Ultrasound for Characterizing Colloids, Particle Sizing, Zeta Potential, Rheology," Dispersion Tehcnology, Inc., NY, USA, First Edition, 2002, 18 pages.
Altenpohl et al., "Hydrated Oxide Films on Aluminum," Journal of Electrochemical Society (Jul. 1961), pp. 628-631.
Derwent, "Derwent—1994-129852", 2013.
JPO, "JPO machine translation of JP06-77094, Nov. 1, 2013, JPO".
Restriction Requirement dated Dec. 5, 2018—Related U.S. Appl. No. 15/459,808.
Response to Restriction Requirement filed Jan. 30, 2019—Related U.S. Appl. No. 15/459,808.
Notice of Allowance dated Feb. 25, 2018—Related U.S. Appl. No. 15/459,808.

* cited by examiner

USE OF NONAFLUOROBUTANESULFONIC ACID IN A LOW PH ETCH SOLUTION TO INCREASE ALUMINUM FOIL CAPACITANCE

PRIORITY CLAIM

This application is a continuation of U.S. patent application Ser. No. 15/459,750, filed Mar. 15, 2017, which claims priority from U.S. Provisional Application Ser. No. 62/429,444, filed Dec. 2, 2016, titled "Use of Nonafluorobutanesulfonic Acid in a Low PH Etch Solution to Increase Aluminum Foil Capacitance." Each patent application identified above is incorporated here by reference in its entirety to provide continuity of disclosure.

BACKGROUND OF THE INVENTION

Field of the Invention

The present disclosure relates generally to methods of using a etch solutions with particular surface active agents to reduce the tendency for overetching and surface erosion during etching of high purity cubicity anode foil. The disclosure also relates to electrolyte bath compositions for such use, to etched foils produced by such methods, and to electrolytic capacitors.

Related Art

Compact, high voltage capacitors are utilized as energy storage reservoirs in many applications, including implantable medical devices. These capacitors are required to have a high energy density since it is desirable to minimize the overall size of the implanted device. This is particularly true of an implantable cardioverter defibrillator (ICD), also referred to as an implantable defibrillator, since the high voltage capacitors used to deliver the defibrillation pulse can occupy as much as one third of the ICD volume.

Implantable cardioverter defibrillators, such as those disclosed in U.S. Pat. No. 5,131,388, incorporated herein by reference, typically use two electrolytic capacitors in series to achieve the desired high voltage for shock delivery. For example, an implantable cardioverter defibrillator may utilize two 350 to 400 volt electrolytic capacitors in series to achieve a voltage of 700 to 800 volts.

Electrolytic capacitors are used in ICDs because they have the most nearly ideal properties in terms of size and ability to withstand relatively high voltage. Conventionally, an electrolytic capacitor includes an etched aluminum foil anode, an aluminum foil or film cathode, and an interposed kraft paper or fabric gauze separator impregnated with a solvent-based liquid electrolyte. The electrolyte impregnated in the separator functions as the cathode in continuity with the cathode foil, while an oxide layer on the anode foil functions as the dielectric.

In ICDs, as in other applications where space is a critical design element, it is desirable to use capacitors with the greatest possible capacitance per unit volume. Since the capacitance of an electrolytic capacitor increases with the surface area of its electrodes, increasing the surface area of the aluminum anode foil results in increased capacitance per unit volume of the electrolytic capacitor. By electrolytically etching aluminum foils, enlargement of the foil surface area occurs. As a result of this enlarged surface area, electrolytic capacitors, manufactured with these etched foils, can obtain a given capacity with a smaller volume than an electrolytic capacitor which utilizes a foil with an unetched surface.

In a conventional electrolytic etching process, foil surface area is increased by removing portions of the aluminum foil to create etch tunnels. While electrolytic capacitors having anodes and cathodes comprised of aluminum foil are most common, anode and cathode foils of other conventional valve metals such as titanium, tantalum, magnesium, niobium, zirconium and zinc are also used. Electrolytic etching processes are illustrated in U.S. Pat. Nos. 4,213,835, 4,420,367, 4,474,657, 4,518,471, 4,525,249, 4,427,506, and 5,901,032.

In conventional processes for etching aluminum foil, an electrolytic bath is used that contains a sulfate, a halide, and an oxidizing agent, such as sodium perchlorate, such as the processes disclosed in U.S. Pat. Nos. 8,871,358, 8,038,866, 7,578,924, 6,858,126, and 6,238,810. Aluminum electrolytic capacitors' energy density is directly related to the surface area of the anodes generated in the electrochemical etching processes. Typical surface area increases are 40 fold and represent 30 to 40 million tunnels/cm$^2$. An electrochemical or chemical widening step is used to increase the tunnel diameter after etching to insure the formation oxide will not close off the tunnels. Closing off of the tunnels during formation will reduce capacitance and electrical porosity.

It would be advantageous to utilize an etch process, particularly for a direct current (DC) etch process, using agents that prevent closing off of the tunnels during formation and increase foil capacitance and anode strength.

SUMMARY OF THE INVENTION

The present disclosure provides improved methods and compositions for the etching of anode foils, as well as etched anode foils provided by such methods and compositions. An embodiment of the disclosure provides a method for etching an anode foil by treating the foil in an aqueous electrolyte bath composition comprising a sulfate, a halide, an oxidizing agent, and a perfluoroalkylsulfonate surface active agent; and passing a charge through the anode foil while the foil is immersed in the electrolyte bath. The method includes treating the foil in an aqueous electrolyte bath composition that includes a surface active agent, such as, e.g., potassium perfluoroalkylsulfonate, and the method results in increased foil capacitance.

In any of the embodiments of the disclosure, the anode foil can be first precleaned prior to treating the foil in an aqueous electrolyte bath composition. Precleaning is conducted by immersing the foil in a corrosive composition, such as hydrochloric acid.

Another embodiment of the disclosure is directed to an aqueous electrolyte bath composition for etching anode foil. The composition includes a sulfate, a halide, an oxidizing agent, and a perfluoroalkylsulfonate surface active agent. The composition can include a chloride, such as sodium chloride, potassium perfluoroalkylsulfonate, and an oxidizing agent such as a perchlorate, e.g., sodium perchlorate.

Another embodiment of the disclosure is directed to an etched anode foil, provided by a method that comprises adding an etch resist onto the anode foil, treating the anode foil in an aqueous electrolyte bath composition comprising a sulfate, a halide, an oxidizing agent, and a perfluoroalkylsulfonate surface active agent, and passing a direct charge through the anode foil while the foil is immersed in the electrolyte bath, such that the anode foil is etched.

Another embodiment of the disclosure is directed to an electrolytic capacitor comprising a foil etched by the methods described herein. A further embodiment of the disclosure is directed to an ICD comprising a capacitor, wherein the capacitor comprises a foil anode etched by the methods described herein.

It has been discovered that a perfluoroalkylsulfonate surface active agent, which is thermally and electrochemically stable, can be used in etch processes to obtain a high capacitance yield in a stable etch solution that is easy to maintain. Accordingly, the present disclosure provides improved methods and compositions for etching anode foil, as well as anode foils produced using such methods.

DETAILED DESCRIPTION OF THE INVENTION

Figure 1:
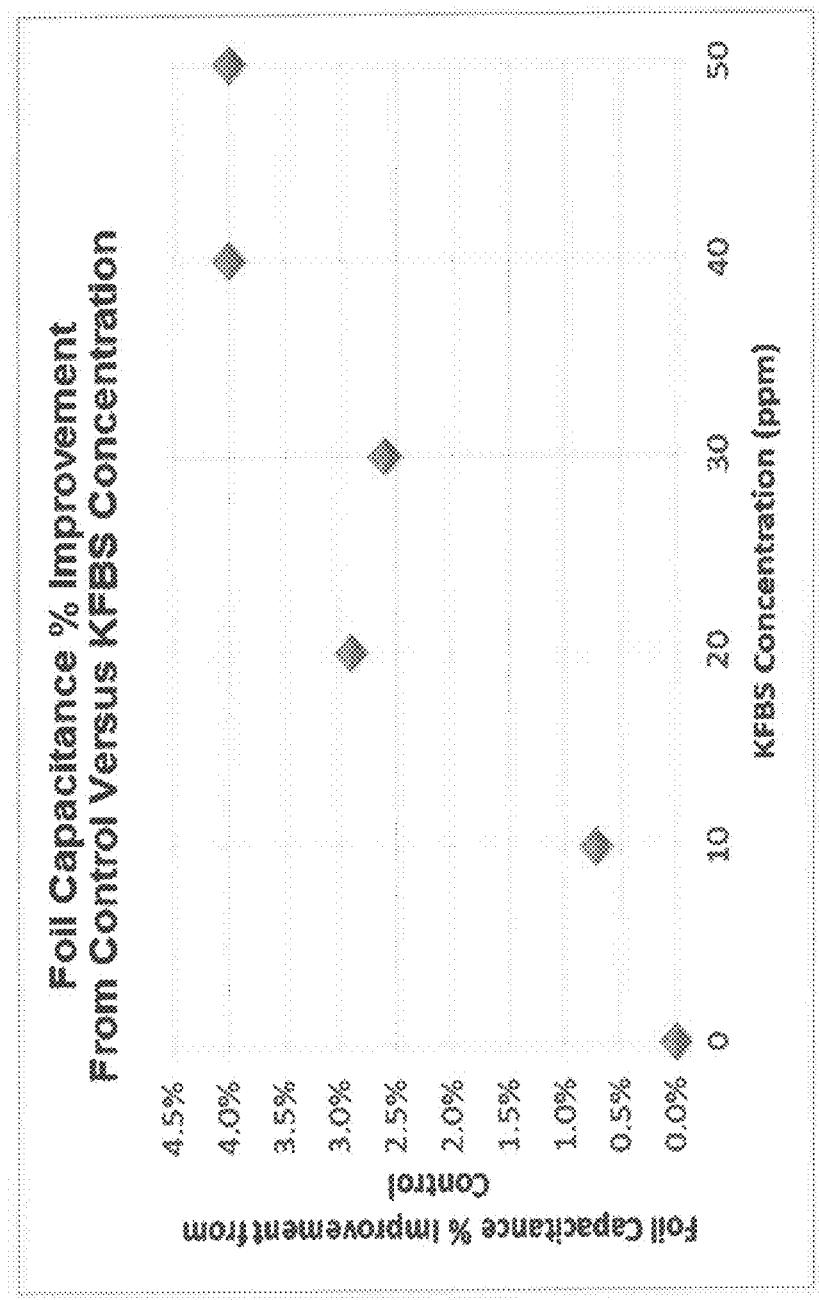
FIG. 1 illustrates the foil capacitance versus the concentration of potassium nonafluorobutanesulfonate in the etch electrolyte composition, after etching of an aluminum anode foil according to the present disclosure.

The present disclosure provides compositions and methods for etching of anode foils, especially aluminum anode foils, to increase surface area and capacitance. Several factors contribute to increasing the specific capacitance of aluminum electrolytic capacitor foil. One factor is the amount of increase in tunnel density (i.e., the number of tunnels per square centimeter). As tunnel density is increased, a corresponding enlargement of the overall surface area will occur. Another factor controlling the increase in specific capacitance is the length of the etch tunnel. Longer tunnels or through tunnels result in higher surface area. The tunnel density and tunnel length are both determined by the type of etch process.

Using the electrolyte bath composition of the present disclosure, the foil can be etched anodically under the influence of a charge in an electrolyte bath. In particular, the foil can be etched by treating the anode foil in an electrolyte bath composition comprising a sulfate, a halide, an oxidizing agent, and a perfluoroalkylsulfonate surface active agent, and passing a charge through the anode foil while the foil is immersed in the electrolyte bath. Any and all embodiments of the electrolyte bath composition may be employed in the methods for etching of anode foils of the present disclosure.

The electrolytic bath composition of the present disclosure contains sulfate ($SO_4^{2-}$). The sulfate is provided by a sulfate salt or acid. Suitable sulfate salts and acids include sodium sulfate, potassium sulfate, lithium sulfate, and sulfuric acid, or other soluble sulfate salts, with sulfuric acid preferred. The amount of sulfate salt or acid provided in the electrolytic bath composition can range from about 100 parts per million (ppm) to about 2000 ppm (e.g. ranging from about 250 ppm to about 1000 ppm). In another embodiment, the sulfate salt or acid is provided in an amount of from about 0.8 to about 1.0% by weight being preferred.

The electrolyte bath composition also contains a halide. The halide is provided by a halide salt, acid, or mixture thereof. The type of halide salt or acid is not particularly limited, so long as the halide ion is provided to interact with the sulfate. The halide is believed to help provide for pit initiation and tunnel propagation of the anode foil. Suitable halide salts and acids include titanium (III) chloride, sodium chloride, and hydrochloric acid. A preferred halide salt or acid is hydrochloric acid. The amount of the halide salt or acid added ranges from about 1% to about 6% by weight of the electrolyte bath composition, more preferably ranging from about 0.5% to about 3% by weight.

The electrolyte bath composition also contains an oxidizing agent that is used in conjunction with the halide, provided in the bath by addition of, for example iodic acid, iodine pentoxide, iodine trichloride, sodium perchlorate, sodium peroxide, hydrogen peroxide, sodium pyrosulfate, and mixtures thereof. Preferably, the oxidizing agent is thermally stable and/or chemically stable, e.g. it is not unduly reduced at the cathode, and helps to create high tunnel density and long tunnels for the etched foil. A preferred oxidizing agent is perchlorate, provided by sodium perchlorate. In one embodiment, sodium perchlorate is used in conjunction with a halide, provided by, e.g., hydrochloric acid.

The amount of oxidizing agent ranges from about 2% to about 12% by weight of the electrolyte bath composition, more preferably ranging from about 2% to about 6% by weight. Preferably, the weight ratio of oxidizing agent to halide is at least about 2 to 1, as measured by the weight of the perchlorate salt and the halide salt or acid used to create the bath. In one embodiment, the weight ratio of oxidizing agent to halide is about 2 to 1. In another embodiment, the weight ratio of oxidizing agent to halide is about 5.6 to 1.

As an example, the amount of sodium perchlorate added can range from about 2% to about 12% by weight of the electrolyte bath composition, more preferably ranging from about 2% to about 6% by weight. Similarly, the amount of sodium chloride added can range from about 1% to about 6% by weight of the electrolyte bath composition; more preferably ranging from about 1% to about 3% by weight. Illustratively, the weight ratio of sodium perchlorate added to sodium chloride added is about 2 to 1.

The electrolyte bath composition also contains a perfluoroalkylsufonate surface active agent. It has been discovered that particular surface active agents increase foil capacitance and lower the amount of etching coulombs to achieve an equivalent surface area. In addition, less surface erosion on the foil improves the anode strength leading to higher anode punch yields. Typical surface active agents include perfluoroalkylsufonate, typically provided as acids or as salts thereof. Perfluoroalkylsufonates are well-known in the art and are readily available from commercial sources (e.g., Sigma-Aldrich Co. LLC.; Charkit Chemical Corp.; Mitsubishi Materials Electronic Chemical Co., Ltd.; or Fisher Scientific). Preferably, the salt of the perfluoroalkylsulfonic acid is an alkali metal salt or an ammonium salt. More preferably, the salt of the perfluoroalkylsulfonic acid is a sodium, potassium, lithium, or ammonium salt. Even more preferably, the salt of the perfluoroalkylsulfonic acid is a potassium salt. Preferably, the alkyl group of the perfluoroalkylsulfonic acid is a $C_1$-$C_8$ alkyl group. More preferably, the alkyl group of the perfluoroalkylsulfonic acid is a $C_1$-$C_6$ alkyl group. Even more preferably, the alkyl group of the perfluoroalkylsulfonic acid is a $C_1$-$C_4$ alkyl group. Even more preferably, the perfluoroalkylsulfonic acid is nonafluorobutanesulfonic acid. In one embodiment, the surface active agent is provided as the acid. In another embodiment, the surface active agent is provided as a salt thereof, such as potassium nonafluorobutanesulfonate.

In an embodiment, the perfluoroalkylsulfonate is provided as an aqueous solution of $C_1$-$C_8$ perfluoroalkylsulfonic acid or a salt thereof. In another embodiment, the solution comprising $C_1$-$C_8$ perfluoroalkylsulfonic acid or a salt thereof and an aqueous solvent further comprises an amine base. Suitable amine bases include ethanolamine, diethanolamine, triethanolamine, ethylamine, diethylamine, triethyamine, methylamine, dimethylamine, trimethylamine or ammonia. Preferably the amine base is diethanolamine. In another embodiment, the solution comprising $C_1$-$C_8$ perfluoroalkylsulfonic acid or a salt thereof, an aqueous solvent, and amine base has a pH of about 4 to about 9, preferably the pH is about 7.

It is desirable to employ an amount of surface active agent that increases foil capacitance, lowers the amount of etching coulombs to achieve an equivalent surface area, and reduces surface erosion on the foil, improving anode strength leading to higher anode punch yields. Suitable amounts of surface active agent include from about 10 ppm to about 150 ppm, preferably from about 10 ppm to about 150 ppm. For instance, the surface active agent is present in the amount of about 20 ppm, about 21 ppm, about 22 ppm, about 23 ppm, about 24 ppm, about 25 ppm, about 26 ppm, about 27 ppm, about 28 ppm, about 29 ppm, about 30 ppm, about 31 ppm, about 32 ppm, about 33 ppm, about 34 ppm, about 35 ppm, about 36 ppm, about 37 ppm, about 38 ppm, about 39 ppm, about 40 ppm, about 41 ppm, about 42 ppm, about 43 ppm, about 44 ppm, about 45 ppm, about 50 ppm, about 51 ppm, about 52 ppm, about 53 ppm, about 75 ppm, about 76 ppm, about 78 ppm, about 100 ppm, about 101 ppm, about 102 ppm, about 130 ppm, about 132 ppm, about 133 ppm, about 140 ppm, about 142 ppm, about 147 ppm, about 150 ppm, about 151 ppm, about 153 ppm, and about 155 ppm.

For example, foil capacitance is expected to increase with increasing amounts of surface active agent up to about 150 ppm. Above the 150 ppm level, foil capacitance is expected to remain constant or decrease.

An illustrative electrolytic bath composition for use in the present method comprises 20 ppm perfluoroalkylsulfonate provided by an aqueous solution of 10% potassium nonafluorobutanesulfonate and diethanolamine so that the pH is about 7, chloride provided by 0.62% by weight hydrochloric acid, sulfate provided by 0.92% by weight sulfuric acid, and perchlorate provided by 3.5% by weight sodium perchlorate.

In the method of the present disclosure, the foil can be etched anodically under the influence of an electrical charge in an electrolyte bath, preferably by a direct current (DC). The use of a DC charge will be discussed below.

Using the method of the present disclosure, foil capacitance is increased compared to etched foil prepared with an electrolyte bath without the $C_1$-$C_8$ perfluoroalkylsulfonic acid additive. In an embodiment of the present disclosure, the foil capacitance is increased by about 0.5%. In another embodiment of the present disclosure, the foil capacitance is increased by about 7% to about 8%. In another embodiment, the foil capacitance is increased by about 0.5% or by about 7% to about 8% wherein the perfluoroalkylsulfonate is a perfluoroalkylsulfonic acid or salt thereof. In another embodiment, the foil capacitance is increased by about 3% or by about 7% to about 8% wherein the perfluoroalkylsulfonate is a perfluoroalkylsulfonic acid or salt thereof. In a preferred embodiment, the foil capacitance is increased by about 4% wherein the perfluoroalkylsulfonate is provided by a potassium salt.

The electrolyte bath composition is heated to a temperature ranging from about 60° C. and 95° C. (e.g. about 75° C. and about 85° C.), with about 80° C. to 81° C. preferred. Illustratively, foil capacitance is expected to increase with increasing temperature, with a peak capacitance provided when the electrolyte bath is heated in the range of about 80° C. to about 81° C.

The foil (preferably a high purity, high cubicity etchable strip as supplied by vendors known to those in the art, and also as discussed below) is inserted into the electrolyte bath composition of the present disclosure and etched at a DC charge density in an amount ranging from about 0.1 to about 0.5 A/cm$^2$ (e.g., ranging from about 0.1 to about 0.4 A/cm$^2$, or from about 0.1 to 0.3 A/cm$^2$), with about 0.15 A/cm$^2$ preferred. The etching can be carried out with an etching charge ranging from about 20 to about 100 coulombs/cm$^2$ (e.g. ranging from about 40 to about 80 coulombs/cm$^2$, or about 60 to about 80 coulombs/cm$^2$, or about 60 to about 70 coulombs/cm$^2$), with a range of about 60 to about 70 coulombs/cm$^2$ preferred. The time for which the foil is etched ranges from about 2 minutes to about 11 minutes (e.g., about 2 minutes, 13 seconds to about 11 minutes, 6 seconds), with about 6½ to about 7½ minutes preferred (e.g., about 6 minutes, 40 seconds to about 7 minutes, 47 seconds). As is understood by those skilled in the art, the etch charge and time will depend upon the specific applications for which the foil is to be used.

In an embodiment of the disclosure, the etch electrolyte bath composition is maintained at a solids level in an amount ranging from about 5 g/L to about 40 g/L. For example, when aluminum foil is etched according to the methods of the present disclosure, a portion of the solid aluminum hydroxide generated during etching may be removed from the electrolyte bath composition by passing the composition through a medium with a pore size sufficient to filter the solids to an acceptable level. For example, the porous medium may have a pore size ranging from about 25 microns and about 40 microns.

In another embodiment of the disclosure, the foil is precleaned prior to etching. By "precleaning" it is meant that the foil, preferably aluminum foil, is activated by partly removing the natural oxide or contamination and reveals portions of the fresh aluminum surface on which sulfate ions can promote tunnel initiation. Proper precleaning prior to etching results in an increased capacity for the resulting etched foil.

Precleaning of the foil is accomplished by immersing the foil in a corrosive solution, such as HCl, $H_2SO_4$, $H_3PO_4$, or other commercially available solutions such as the Hubbard-Hall Lusterclean solution for a time sufficient to partly expose the fresh aluminum metal on the foil. For example, the foil can be immersed in an aqueous solution containing HCl in an amount ranging from about 0.1% to about 2% by weight (e.g. from about 0.1% to about 1% by weight, or about 0.2% to about 0.5% by weight), preferably about 0.2% by weight, for a time ranging from about 20 seconds to about 2 minutes (e.g. from about 20 seconds to about 1 minute), preferably about 20 seconds. The foil is preferably immersed in the corrosive solution at room temperature (e.g., about 20 to about 30° C.). The foil may then be rinsed with water, preferably deionized water, for at least about one minute.

The foil used for etching according to the present method is preferably etchable aluminum strip of high cubicity. High cubicity in the context of the present disclosure is where at least 80% of crystalline aluminum structure is oriented in a normal position (i.e., a (1,0,0) orientation) relative to the surface of the foil. The foil used for etching is also preferably of high purity. Such foils are well-known in the art and are readily available from commercial sources (e.g., TOYOCHEM CO., LTD. or Showa Chemical Industry Co., Ltd.). Illustratively, the thickness of the aluminum foil ranges from about 50 to about 200 microns, preferably from about 110 microns to about 114 microns.

After etching, the foil is removed from the etch solution and rinsed in deionized water. The tunnels formed during the initial etch are then widened, or enlarged, in a secondary etch solution, typically an aqueous based nitrate solution, preferably between about 1% to about 20% aluminum nitrate, more preferably between about 10% to about 14% aluminum nitrate, with less than about 1% free nitric acid. The etch tunnels are widened to an appropriate diameter by methods known to those in the art, such as that disclosed in U.S. Pat. Nos. 4,518,471 and 4,525,249, both of which are incorporated herein by reference. In embodiments of the disclosure, the widening step comprises electrochemical widening wherein the widening charge ranges from about 60 to about 90 coulombs/cm$^2$, more preferably about 70 to about 80 coulombs/cm$^2$.

After the etch tunnels have been widened, the foil is again rinsed with deionized water and dried. Finally, a barrier oxide layer is formed onto the metal foil by placing the foil into an electrolyte bath and applying a positive voltage to the metal foil and a negative voltage to the electrolyte. The barrier oxide layer provides a high resistance to current passing between the electrolyte and the metal foils in the finished capacitor, also referred to as the leakage current. A high leakage current can result in the poor performance and reliability of an electrolytic capacitor. In particular, a high leakage current results in greater amount of charge leaking out of the capacitor once it has been charged.

The formation process consists of applying a voltage to the foil through an electrolyte such as boric acid and water or other solutions familiar to those skilled in the art, resulting in the formation of an oxide on the surface of the anode foil. The preferred electrolyte for formation is a 100-1000 μS/cm, preferably 500 μS/cm, citric acid concentration. In the case of an aluminum anode foil, the formation process results in the formation of aluminum oxide ($Al_2O_3$) on the surface of the anode foil. The thickness of the oxide deposited or "formed" on the anode foil is proportional to the applied voltage, roughly 10 to 15 Angstroms per applied volt. The formation voltage can be about 250 Volts or higher, preferably about 250 Volts to about 600 Volts, more preferably about 450 Volts to about 510 Volts. The etched and formed anode foils can then be cut and used in the assembly of a capacitor.

The present disclosure thus also provides etched anode foil etched by methods and/or compositions according to the present disclosure. For example, the etched foil can be an etched aluminum foil provided by a method comprising passing a direct charge through an anode foil while the foil is immersed in an electrolyte bath, such that the anode foil is etched, wherein the electrolyte bath comprises sulfate provided by sulfuric acid, halide provided by hydrochloric acid, and a perfluoroalkylsulfonate provided by a perfluoroalkylsulfonic acid or a salt thereof, wherein the foil capacitance is increased relative to etched foil prepared with an electrolyte bath without the $C_1$-$C_8$ perfluoroalkylsulfonic acid additive. The etched anode foil may be etched by any and all embodiments of the electrolyte bath composition. Suitably, the sulfuric acid is provided at about 0.92% by weight, the hydrochloric acid is provided at about 0.62% by weight, the ratio of halide to perchlorate is about 5.6:1, the perfluoroalkylsulfonate is provided at about 10 ppm to about 150 ppm, and the foil capacitance is increased by at least 0.5% relative to etched foil prepared with an electrolyte bath without the $C_1$-$C_8$ perfluoroalkylsulfonic acid additive. Preferably, the etched foil is provided by a method wherein the perfluoroalkylsulfonate is nonafluorobutanesulfonic acid or potassium nonafluorobutanesulfonate. More preferably, the etched foil is provided by a method wherein the perfluoroalkylsulfonate is provided by potassium nonafluorobutanesulfonate.

The present disclosure thus also provides electrolytic capacitors comprising etched anode foil etched by methods and/or compositions according to the present disclosure. Such capacitors can be made using any suitable method known in the art. Non-limiting examples of such methods are disclosed, e.g., in the following references which are entirely incorporated herein by reference: U.S. Pat. No. 4,696,082 to Fonfria et al., U.S. Pat. No. 4,663,824 to Kemnochi, U.S. Pat. No. 3,872,579 to Papadopoulos, U.S. Pat. No. 4,541,037 to Ross et al., U.S. Pat. No. 4,266,332 to Markarian et al., U.S. Pat. No. 3,622,843 to Vermilyea et al., and U.S. Pat. No. 4,593,343 to Ross. The rated voltage of the electrolytic capacitor is preferably above about 250 Volts, such as, e.g. between about 250 Volts and 1000 Volts. Preferably, the voltage is about 400 Volts or higher, more preferably about 400 to about 550 Volts. Illustrative capacitance is about 1.0 μF/cm$^2$ to about 1.4 μF/cm$^2$.

The process of the present disclosure results in a very efficient and economical etching process that yields capacitance values equal to or significantly higher than available foils, without requiring major changes in existing production machinery. The present disclosure provides improved anode strength, leading to higher anode punch yields. Further, the sulfate ion in the chloride containing solution of the present disclosure preferentially adsorbs on the aluminum oxide layer on an aluminum surface of the foil and prevents the chloride ion from attacking the foil and causing the pitting potential to increase. Once the pitting starts, and fresh foil surface is exposed to the etch solution, the sulfate ion can boost the tunnel growth speed and generate long tunnels and branch tunnels.

While the above description and following examples are directed to an embodiment of the present disclosure where a sulfate is added to an etch electrolyte solution to increase the capacitance of aluminum anode foil, sulfate ion can be applied to etch electrolytes to increase the capacitance of other anode foils known to those skilled in the art. For example, the process according to the present disclosure can be used to increase the capacitance of valve metal anode foils such as aluminum, tantalum, titanium, and columbium (niobium).

Electrolytic capacitors manufactured with anode foils etched according to the present disclosure may be utilized in ICDs, such as those described in U.S. Pat. No. 5,522,851 to Fayram. An increase in capacitance per unit volume of the electrolytic capacitor will allow for a reduction in the size of the ICD.

Having now generally described the disclosure, the same will be more readily understood through reference to the following examples which are provided by way of illustration, and are not intended to be limiting of the present disclosure.

EXAMPLES

Example 1

The effect of surface active agent concentration in an etch electrolyte bath compositions on resulting foil capacitance was investigated.

Potassium nonafluorobutanesulfonate was mixed into a low pH etch electrolyte bath compositions containing chloride and strong oxidizers, prepared by providing about 10 ppm to about 40 ppm potassium nonafluorobutanesulfonate in an aqueous solution of chloride provided by hydrochloric acid present at 0.62% by weight, sulfate provided by sulfuric acid present at 0.92% by weight, and perchlorate provided by sodium perchlorate present at 3.5% by weight.

FIG. 1 shows the percentage of improvement of foil capacitance over the control (prepared without potassium nonafluorobutanesulfonate) as a function of the concentration of potassium nonafluorobutanesulfonate added, at 475 Volts EFV.

Figure 2:
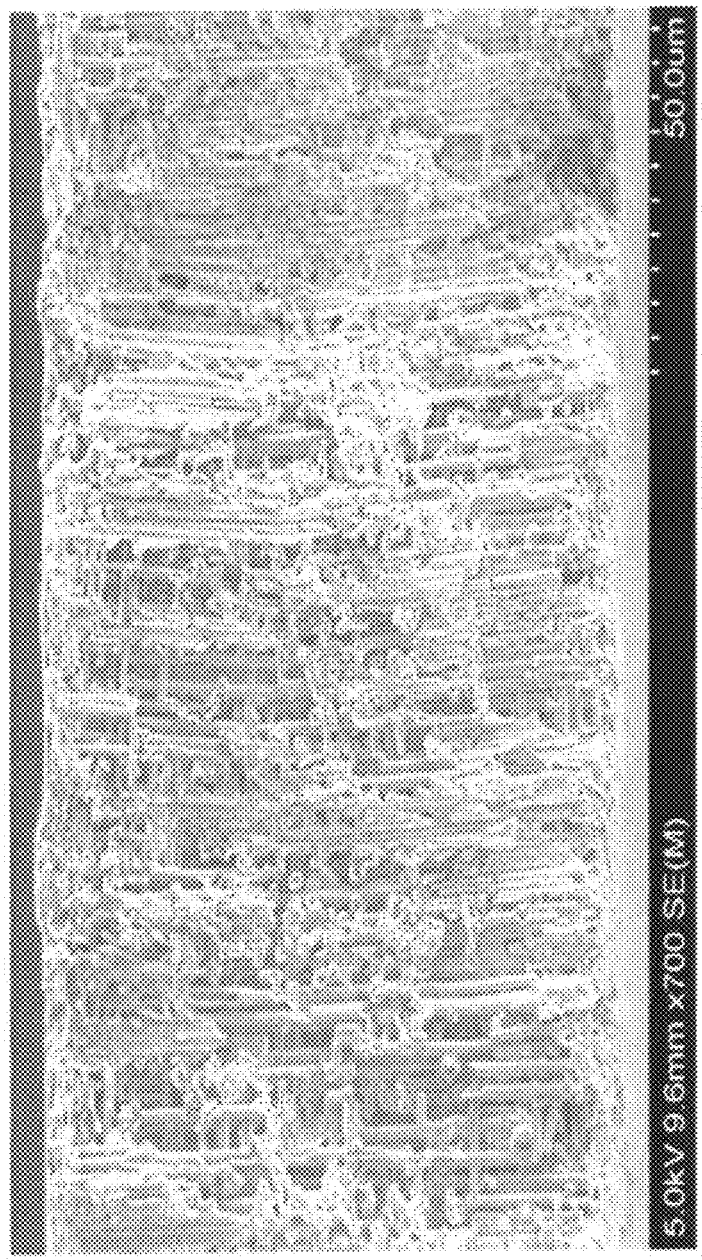
FIG. 2 illustrates an SEM image of etched foil surface etched in an electrolyte bath provided according to the present disclosure, prepared using potassium nonafluorobutanesulfonate.

FIG. 2 shows an SEM image of etched foil surface etched in an electrolyte bath according to Example 1.

Example 2

Nonafluorobutanesulfonic acid was mixed into a low pH etch electrolyte bath compositions containing chloride and strong oxidizers, prepared by providing about 20 ppm nonafluorobutanesulfonic acid in an aqueous solution of chloride provided by hydrochloric acid present at 0.62% by weight, sulfate provided by sulfuric acid present at 0.92% by weight, and perchlorate provided by sodium perchlorate present at 3.5% by weight.

The etch electrolyte bath compositions containing about 20 ppm of nonafluorobutanesulfonic acid increased the foil capacitance by 7.0% over the control etch electrolyte bath compositions that did not contain any nonafluorobutanesulfonic acid.

Example 3

Diethanolamine was added to a solution of nonafluorobutanesulfonic acid to bring the pH of the solution to about 7. This solution was added at 20 ppm of nonafluorobutanesulfonic acid to an aqueous solution of chloride provided by hydrochloric acid present at 0.62% by weight, sulfate provided by sulfuric acid present at 0.92% by weight, and perchlorate provided by sodium perchlorate present at 3.5% by weight.

The etch electrolyte bath compositions containing about 20 ppm of nonafluorobutanesulfonic acid and diethanolamine increased the foil capacitance from 297.7 microF per 270 $cm^2$ sheet to 320.7 microF per 270 $cm^2$ sheet for a 7.2% increase foil capacitance over the control etch electrolyte bath compositions that did not contain any nonafluorobutanesulfonic acid/diethanolamine solution.

Example 4

Potassium nonafluorobutanesulfonate was mixed into a low pH etch electrolyte bath compositions containing chloride and strong oxidizers, prepared by providing about 0 ppm to about 150 ppm potassium nonafluorobutanesulfonate in an aqueous solution of chloride provided by hydrochloric acid present at 0.62% by weight, sulfate provided by sulfuric acid present at 0.92% by weight, and perchlorate provided by sodium perchlorate present at 3.5% by weight.

Figure 3:
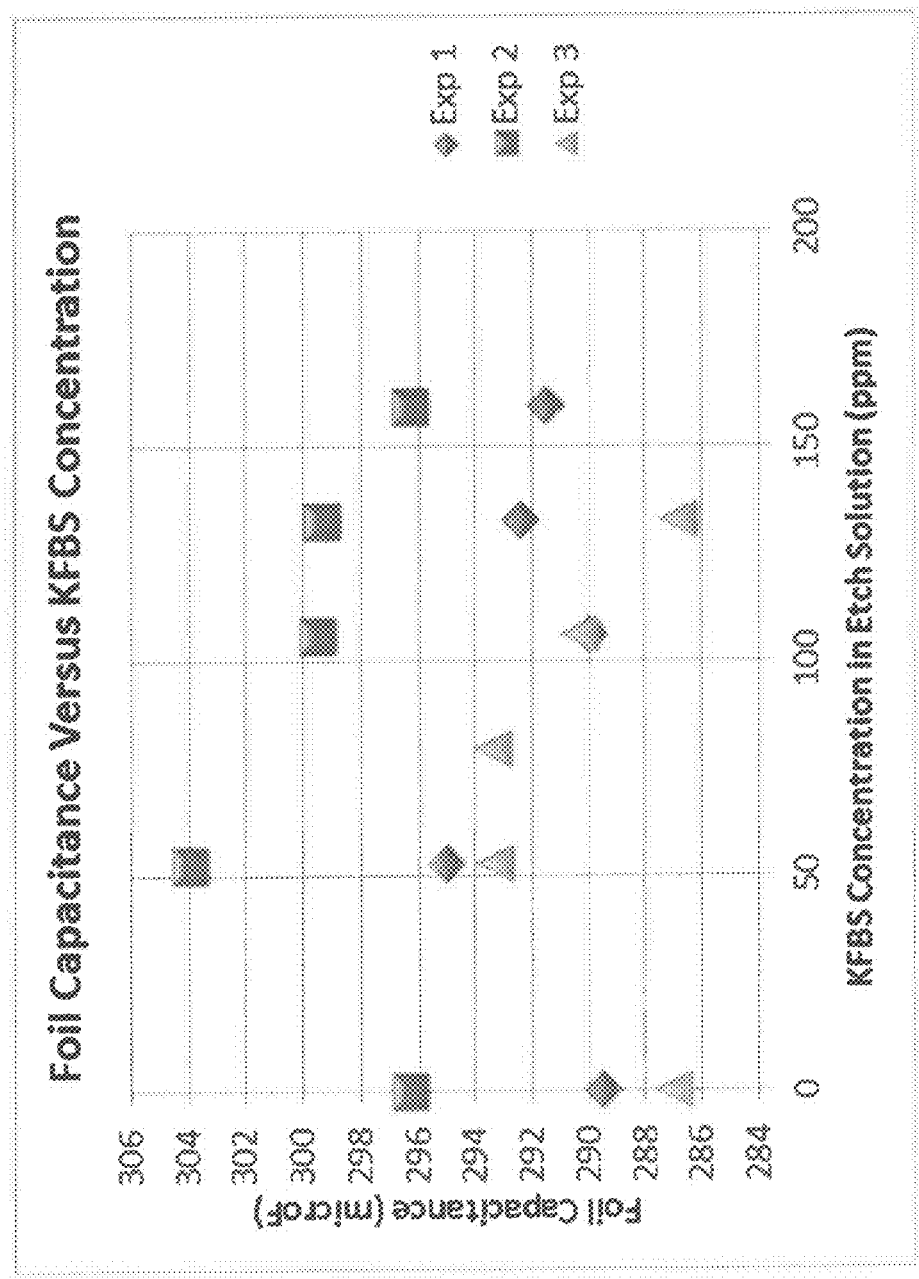
FIG. 3 illustrates the foil capacitance versus the concentration of potassium nonafluorobutanesulfonate in the etch electrolyte composition, after etching of an aluminum anode foil according to the present disclosure.

FIG. 3 shows the foil capacitance as a function of the concentration of potassium nonafluorobutanesulfonate added, at 475 Volts EFV.

While various embodiments of the present disclosure have been described above, it should be understood that they have been presented by way of example only, and not limitation. Thus, the breadth and scope of the present disclosure should not be limited by any of the above-described exemplary embodiments, but should be defined only in accordance with the following claims and their equivalents. Additionally, all references cited herein, including journal articles or abstracts, published or corresponding U.S. or foreign patent applications, issued U.S. or foreign patents, or any other references, are each entirely incorporated by reference herein, including all data, tables, figures, and text presented in the cited references.

It must be noted that as used in the present disclosure and in the appended claims, the singular forms "a", "an", and "the" include plural reference unless the context clearly dictates otherwise. Illustratively, the term "a sulfate salt or acid" is intended to include one or more sulfate salts or acids, including mixtures thereof (e.g., sodium sulfate, potassium sulfate, and/or mixtures thereof) and the term "a halide salt or acid" is intended to include one or more halide salts or acids, including mixtures thereof (e.g. sodium chloride, potassium chloride, and lithium chloride, and/or mixtures thereof).

It is to be appreciated that the Detailed Description section, and not the Summary and Abstract sections, is intended to be used to interpret the claims. The Summary and Abstract sections may set forth one or more but not all exemplary embodiments of the present disclosure as contemplated by the inventor(s), and thus, are not intended to limit the present disclosure and the appended claims in any way.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments, but should be defined only in accordance with the following claims and their equivalents.

What is claimed is:

1. An aqueous electrolyte bath composition for etching anode foil, comprising:
    a sulfate;
    a halide;
    an oxidizing agent; and
    a $C_1$-$C_8$ perfluoroalkylsulfonate in an amount ranging from about 10 to 90 parts per million (ppm).

2. The composition of claim 1, wherein said $C_1$-$C_8$ perfluoroalkylsulfonate is present in the electrolyte bath composition in an amount ranging from about 20 to about 70 ppm.

3. The composition of claim 1, wherein the $C_1$-$C_8$ perfluoroalkylsulfonate comprises nonafluorobutanesulfonic acid (FBSA) and/or a salt thereof.

4. The composition of claim 1, wherein the $C_1$-$C_8$ perfluoroalkylsulfonate is an alkali metal nonafluorobutanesulfonate.

5. The composition of claim 4, wherein the alkali metal is potassium.

6. The composition of claim 1 wherein:
the $C_1$-$C_8$ perfluoroalkylsulfonate is selected from the group consisting of nonafluorobutanesulfonic acid (FBSA), potassium perfluoroalkylsulfonate (KFBS), and mixtures thereof,
the sulfate is sulfuric acid and said electrolyte bath composition comprises about 0.8% by weight to about 1.0% by weight sulfuric acid,
the halide is hydrochloric acid and said electrolyte bath composition comprises about 0.5% by weight to about 3% by weight hydrochloric acid, and
the oxidizing agent is sodium perchlorate and said electrolyte bath composition comprises about 2% by weight to about 6% by weight sodium perchlorate.

7. The composition of claim 6, wherein said electrolyte bath composition comprises:
about 0.92% by weight sulfuric acid;
about 0.62% by weight hydrochloric acid; and
about 3.5% by weight sodium perchlorate.

8. The composition of claim 7, wherein the $C_1$-$C_8$ perfluoroalkylsulfonate is FBSA and/or KFBS.

9. The composition of claim 8, further comprising diethanolamine (DEA).

10. A method of etching an anode foil, comprising:
passing a direct current (DC) charge through an anode foil while the anode foil is immersed in an aqueous electrolyte bath, wherein said aqueous electrolyte bath comprises:
a sulfate;
a halide;
an oxidizing agent; and
a $C_1$-$C_8$ perfluoroalkylsulfonate in an amount ranging from about 10 to 90 parts per million (ppm); such that the anode foil is etched.

11. The method of claim 10, wherein the $C_1$-$C_8$ perfluoroalkylsulfonate is provided as an aqueous solution of $C_1$-$C_8$ perfluoroalkylsulfonic acid and/or a salt thereof.

12. The method of claim 11, wherein the $C_1$-$C_8$ perfluoroalkylsulfonic acid or salt thereof is nonafluorobutanesulfonic acid (FBSA) and/or potassium nonafluorobutanesulfonate (KFBS).

13. The method of claim 10, wherein the anode foil is etched so as to form branched tunnels in the anode foil.

14. The method of claim 10, wherein the anode foil is etched so as to form tunnels in the anode foil, and further comprising:
widening the tunnels after etching the anode foil.

15. The method of claim 10, further comprising:
making a capacitor that includes the etched anode foil as an anode.

16. The composition of claim 1, wherein the foil is immersed in the bath.

17. The composition of claim 16, wherein the bath etches tunnels in the foil.

18. The composition of claim 1, wherein the bath further comprises: an amine base.

19. The composition of claim 18, wherein the amine base is selected from a group consisting of: ethanolamine, diethanolamine, triethanolamine, ethylamine, diethylamine, triethyamine, methylamine, dimethylamine, trimethylamine, and ammonia.

20. The composition of claim 1, wherein the bath has a composition of 4 to 9.

\* \* \* \* \*